United States Patent

Iwasa et al.

Patent Number: 5,389,409
Date of Patent: Feb. 14, 1995

[54] WEATHERSTRIP

[75] Inventors: Tadanobu Iwasa; Keiji Akachi; Toshiyuki Tanaka; Shinichi Yoshioka, all of Inazawa, Japan

[73] Assignee: Toyoda Gosei Co., Ltd., Nishikasugai, Japan

[21] Appl. No.: 986,537

[22] Filed: Dec. 7, 1992

[30] Foreign Application Priority Data

Dec. 5, 1991 [JP] Japan .................. 3-322160

[51] Int. Cl.⁶ .............. B60R 13/04; B60R 13/06; B32B 7/12
[52] U.S. Cl. ...................... 428/31; 428/40; 428/261; 428/352; 428/358; 49/475; 49/490; 49/498
[58] Field of Search ............ 428/31, 40, 122, 261, 428/352, 358; 49/475, 490, 498

[56] References Cited

U.S. PATENT DOCUMENTS

| | | | |
|---|---|---|---|
| 4,609,589 | 9/1986 | Hosoda et al. | 428/40 X |
| 4,614,347 | 9/1986 | Kruschwitz | 277/184 |
| 4,617,220 | 10/1986 | Ginster | 428/122 |
| 4,728,571 | 3/1988 | Clemens et al. | 428/352 |
| 4,871,611 | 10/1989 | Le Bel | 428/352 X |
| 4,880,674 | 11/1989 | Shimizu | 428/31 |
| 4,973,371 | 11/1990 | Parker | 428/31 X |
| 5,143,772 | 9/1992 | Iwasa | 428/31 X |
| 5,154,952 | 10/1992 | Nozaki | 428/31 |
| 5,304,409 | 4/1994 | Nozaki | 428/122 |

FOREIGN PATENT DOCUMENTS 0460841 12/1991 European Pat. Off. .

OTHER PUBLICATIONS

Pending U.S. Application 07/844,485 filed Mar. 4, 1992, Nozaki.

Primary Examiner—Daniel R. Zirker
Attorney, Agent, or Firm—Cushman, Darby & Cushman

[57] ABSTRACT

A weatherstrip including a strip body provided with base. The base includes a surface to which the weatherstrip is fitted onto a vehicle body and a seal portion formed integrally with the base. An adhesive layer is applied on the fitting surface, for adhering the strip body to the vehicle body. A release liner is provided for protecting the adhesive layer until the weatherstrip is fitted. The release liner contains a synthetic resin nonwoven fabric layer and a film layer laminated thereon, and has a high tensile strength.

7 Claims, 3 Drawing Sheets

WEATHERSTRIP

This application claims the priority of Japanese Patent Application No. 3-322160 filed on Dec. 5, 1991, which is incorporated by reference.

BACKGROUND OF THE INVENTION

1. Field of the Invention

The present invention generally relates to a weatherstrip, to be placed between the body and door of a vehicle, for preventing water, dust and noise from leaking to the inside. More particularly, the invention relates to a weatherstrip having an adhesive for securing it to the vehicle. Further, the invention relates to a release liner for the adhesive.

2. Description of the Art

Weatherstrips with a pressure-sensitive, double coated adhesive tape are well known. Many conventional weatherstrips are equipped with clips. When such a weatherstrip is fitted on a vehicle body, it is first clamped thereto by means of the clips. The release liner covering another surface of the adhesive tape is peeled off to allow the exposed adhesive surface to be adhered under pressure, to the vehicle body. Thus, the weatherstrip is secured onto the vehicle body.

However, the release liner is generally made of a paper and has insufficient strength, and often times, it gets torn when it is peeled off, thus interfering with the smooth fitting of the weatherstrip. Moreover, the torn liner cannot be reused.

In an effort to overcome this problem, a release liner made of a synthetic resin film such as polyethylene, which is stronger than paper has been proposed. However, even such a liner does not possess the desired strength and exhibits a similar problem to that of the paper liner.

Conceivably, a woven fabric made of a high-strength material such as aramid fibers and polyester fibers, can be used for the release liner in order to overcome the problem of the liner tearing. However, since such materials are expensive, the cost of the release liner and consequently the weatherstrip will be high. Therefore, such a solution is not a realistic one.

For example, U.S. Pat. No. 4,614,347 to Kruschwitz discloses a trimming and sealing strip. The two-piece sealing assembly is secured in position by a double-sided adhesive strip 26. In U.S. Pat. No. 4,617,220 to Ginster, a sealing and trimming strip is disclosed, which includes a central portion and two wing portions. On the underside of the wings 5 and 6 are adhesive layers 24 and 26, with the adhesive layers having an outer surface that may be protected by a tear-off covering. In U.S. Pat. No. 5,154,952 to Nozaki, an adhesive tape bonded to a bottom surface of the weather strip secured the weather strip to a body panel of a vehicle. Further, U.S. application Ser. No. 07/844,485, now U.S. Pat. No. 5,304,409, discloses a weatherstrip fixed to a vehicle body via an adhesive tape.

SUMMARY OF THE INVENTION

Accordingly, it is a primary object of the present invention to provide a weatherstrip having an inexpensive release liner which does not tear when peeled off, and which can be reused.

To achieve the foregoing and other objects and in accordance with the purpose of the present invention, an improved weatherstrip to be fitted to the vehicle body is provided.

The weatherstrip according to this invention includes a strip body having a base with a surface to which the weatherstrip is fitted onto a vehicle body (fitting surface), and a seal portion formed integrally with the base. The inventive weatherstrip further includes an adhesive layer applied to the fitting surface, and a release liner. The release liner protects the adhesive layer until the weatherstrip is fitted. The release liner contains a layer of synthetic resin non-woven fabric and a film layer laminated on the non-woven fabric layer.

The features of this invention that are believed to be novel are set forth with particularity in the appended claims. The invention, together with the objects and advantages thereof, may be best understood by reference to the following description of the preferred embodiments taken in conjunction with the accompanying drawings.

BRIEF DESCRIPTION OF THE DRAWINGS

FIGS. 1 through 5 illustrate a first embodiment of a weatherstrip according to the present invention, wherein:

FIG. 1 is a cross-sectional, perspective view of a release liner for use with the weatherstrip of FIG. 2;

FIG. 2 is a cross-sectional view of the weatherstrip shown secured to a vehicle body;

FIG. 3 is a cross-sectional view of a multilayered adhesive layer used with the release liner of FIG. 1;

FIG. 4 is a cross-sectional view of one fiber from which the non-woven fabric layer of the release liner is made; and FIG. 5 is a cross-sectional view of the adhesive layer after the release liner is peeled off but before the weatherstrip is fixed to the vehicle body.

DETAILED DESCRIPTION OF THE PREFERRED EMBODIMENTS

The automotive door weatherstrip, of the present invention will now be described with reference being made to FIGS. 1 through 5.

Figure 2:
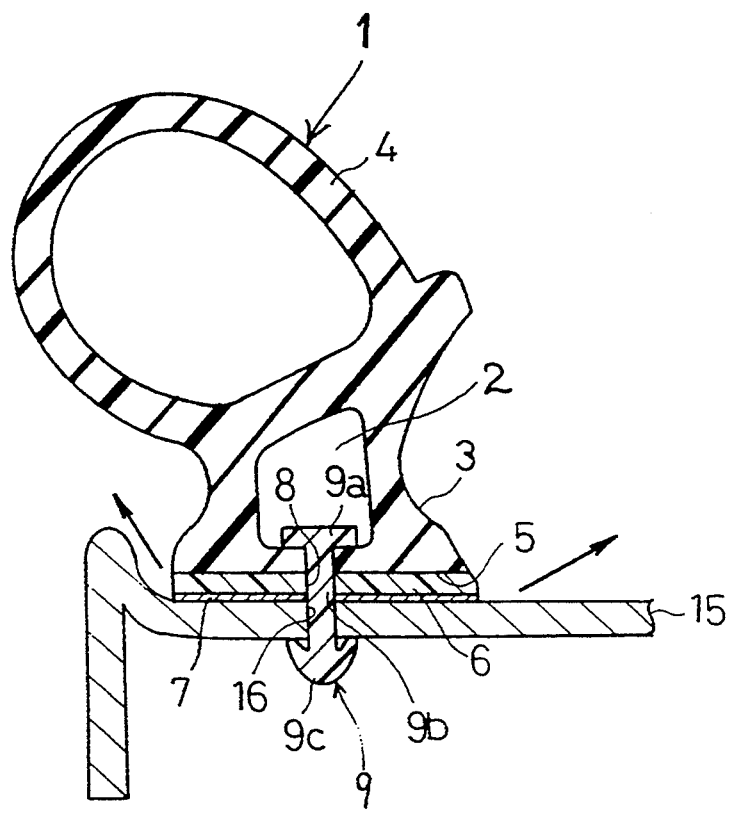

As shown in FIG. 2, the weatherstrip 1 is preferably made of an ethylene-propylene-diene terpolymer (EPDM), and has a base 3 with a cavity 2 defined therein, and a tubular seal portion 4 formed integrally with the base 3. The base 3 has a flat fitting surface 5 which is generally disposed opposite to the seal portion 4. The fitting surface 5 is designed to contact a vehicle body 15. An adhesive layer 6 is formed on the fitting surface 5. The surface of the adhesive layer 6, which is to be exposed, is protected with a release liner 7. The adhesive layer 6 and the release liner 7 will be described later in more detail.

The base 3 of the weatherstrip 1 has a plurality of holes 8 (only one such hole 8 is shown in FIG. 2), with the holes 8 being separated from one another by predetermined distances. These holes 8 provide a means for communication between the cavity 2 and the outside of the base 3. A clip 9 is fitted in each hole 8. Each clip 9 has a root portion 9a, having a diameter greater than the inner diameter of the hole 8, to be positioned in the cavity 2. Each clip 9 further includes a pin portion 9b which penetrates through the hole 8 and protrudes from the fitting surface 5, and a mushroom-like engaging portion 9c which extends from the tip of the pin portion 9b.

Figure 3:
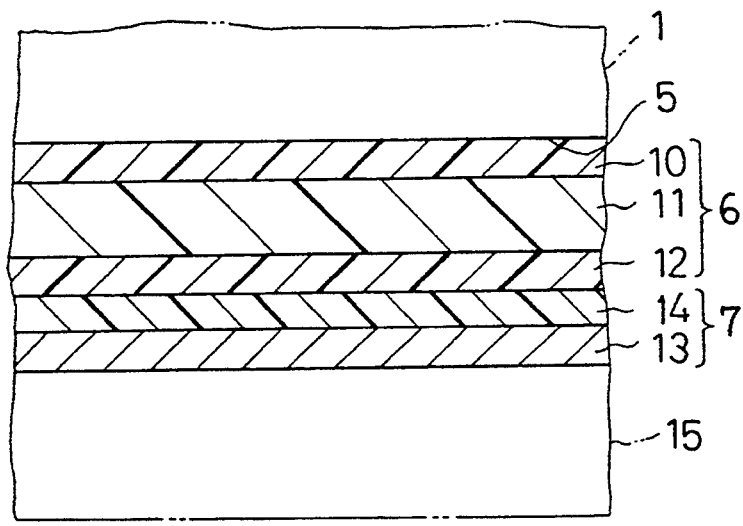

As shown in FIG. 3, the multi-layered adhesive layer 6 includes a heat-fusible film 10, a urethane sheet 11 and an adhesive 12 applied to the sheet 11, which are laminated in this order on the fitting surface 5. It should however be understood that other lamination orders are also possible within the scope of the invention.

The heat-fusible film 10 bonds the fitting surface 5 to the adhesive layer 6. While the adhesive layer 6 having a heat-fusible film 10 is used in this embodiment, the adhesive layer 6 may be replaced with a pressure-sensitive adhesive double coated tape. In this case, one side of the tape is used for bonding with the fitting surface 5.

Figure 4:
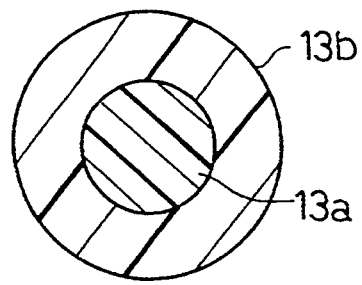

The release liner 7 applied on the surface of the adhesive 12 includes a non-woven fabric layer 13 and a film layer 14. The fiber forming the non-woven fabric layer 13 is a composite fiber having a core 13a made of polyethylene terephthalate (PET) and a sheath 13b made of polyethylene (PE), as shown in FIG. 4. The film layer 14 is formed using a polyethylene drawn film.

Figure 1:
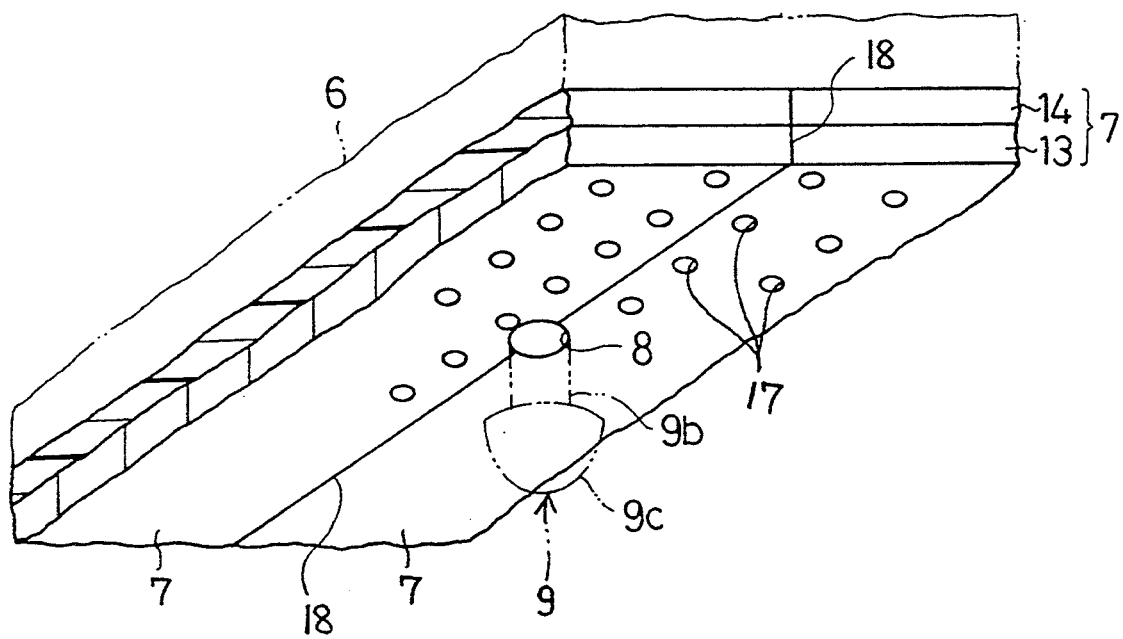

The non-woven fabric layer 13 and the film layer 14 are bonded to each other by heat fusion, by using a press having a pressure plate with a multiplicity of projections. A number of small openings 17 on the surface of the release liner 7 as shown in FIG. 1 are formed by the projections of the pressure plate. The release liner 7 is divided into two portions by a center slit 18 extending generally, along the longitudinal center line for the entire length of the release liner 7. The split liner pieces can therefore be peeled from the weatherstrip 1 in spite of the presence of the clips 9.

The procedure for fitting the weatherstrip 1 to the vehicle body 15 will now be described.

The engaging portions 9c of the clips 9 are first fitted respectively into fitting holes 16 defined in the vehicle body 15, as shown in FIG. 2. The fitting of the weatherstrip 1 to the vehicle body 15 is completed by the engagement of the clips 9 with the vehicle body 15 as the portions 9c is inserted through the fitting holes 16.

Subsequently, the split pieces of the release liner 7 located between the base 3 and the vehicle body 15 are peeled off outward respectively (as shown by the arrows). Since the release liner 7 according to the present embodiment includes a double layered structure of the non-woven fabric layer 13 and the film layer 14 which are heat-fused to one another, it has an extremely high strength. Accordingly, the release liner 7 will not be torn by the tension applied thereto when it being peeled off. The polyethylene forming the film layer 14 is partly allowed to penetrate into the non-woven fabric layer 13 to a certain depth by the heat-fusing treatment, using a press plate having a multiplicity of projections, thus avoiding delamination of the non-woven fabric layer 13 from the film layer 14.

Figure 5:
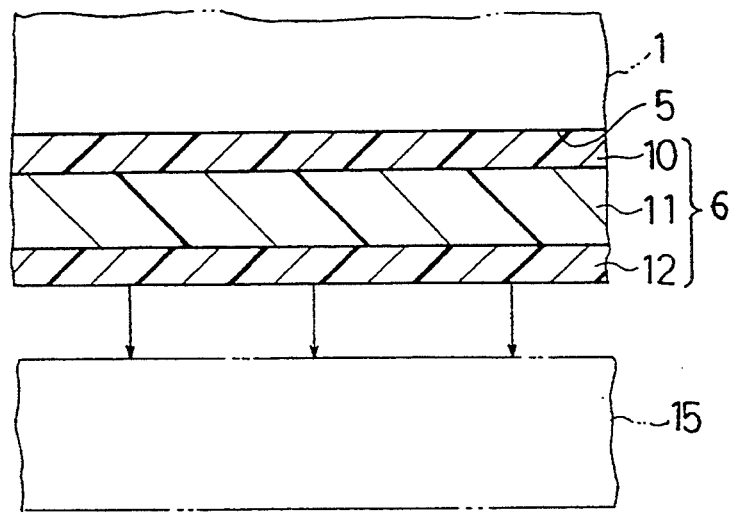

The removal of the release liner 7 exposes the adhesive 12 of the adhesive layer 6, as shown in FIG. 5. The adhesive surface is then directly applied to the vehicle body 15 to complete the fitting of the weatherstrip 1 to the vehicle body 15. Thus, the weatherstrip 1 is secured to the vehicle body 15 by the combination of the clips 9 and the adhesive layer 6.

As has been described above, since the release liner 7 has a high strength, it allows a smoother fitting of the weatherstrip 1. Such excellent strength of the release liner 7 has been confirmed by tensile tests. In this test, a longitudinal tension is applied to a liner (thickness: 110 μm; width 5 mm) to determine the tensile breaking strength. A liner made of polyethylene film only showed a tensile strength at break of 1 kgf, whereas the liner 7 according to this embodiment demonstrated a tensile strength at break of 4 kgf.

The outer layer 13 of the release liner 7 is made of a comparatively inexpensive synthetic resin non-woven fabric. Accordingly, the liner 7 is relatively inexpensive compared with the liners made of high-strength materials such as aramid fibers and polyester fibers. Moreover, since the release liner 7 includes a double layered structure it is hardly stretched or deformed by the pulling force exerted thereupon. Consequently the release liner 7 can be reused for several applications, thus, reducing waste and cost. As described above, the primary fitting is carried out by the clip 9 prior to the secondary fitting by the adhesive layer 6. Such a fitting procedure enables correct positioning of the weatherstrip 1, and, in turn, prevents the adhesive layer 6 from crimping on the fitting surface 5 when applied to the vehicle body 15.

Although only one embodiment of the present invention has been described herein, it should be apparent to those skilled in the art that the present invention may be embodied in many other specific forms without departing from the scope of the invention. Particularly, it should be understood that the present invention may be embodied in the following manner.

While the non-woven fabric layer 13 is made of a composite fiber having a core (PET core)-and-sheath (PE sheath) structure in the above embodiment, the fiber to be used in the non-woven fabric layer 13 may be selected from other synthetic resins, such as polyester resins including polyethylene terephthalate (PET), polyamide resins including Nylon 6 (trade name, Dupont Corp.) and Nylon 6,6 (trade name, Dupont Corp.), and polyolefin resins including polyethylene and polypropylene. The non-woven fabric layer can be made of a single polyethylene fiber without using another kind of fiber. The material forming the film layer 14 is not necessarily limited to polyethylene and other synthetic resins such as polypropylene, polyester and polyvinyl chloride (PVC).

Figure 6:
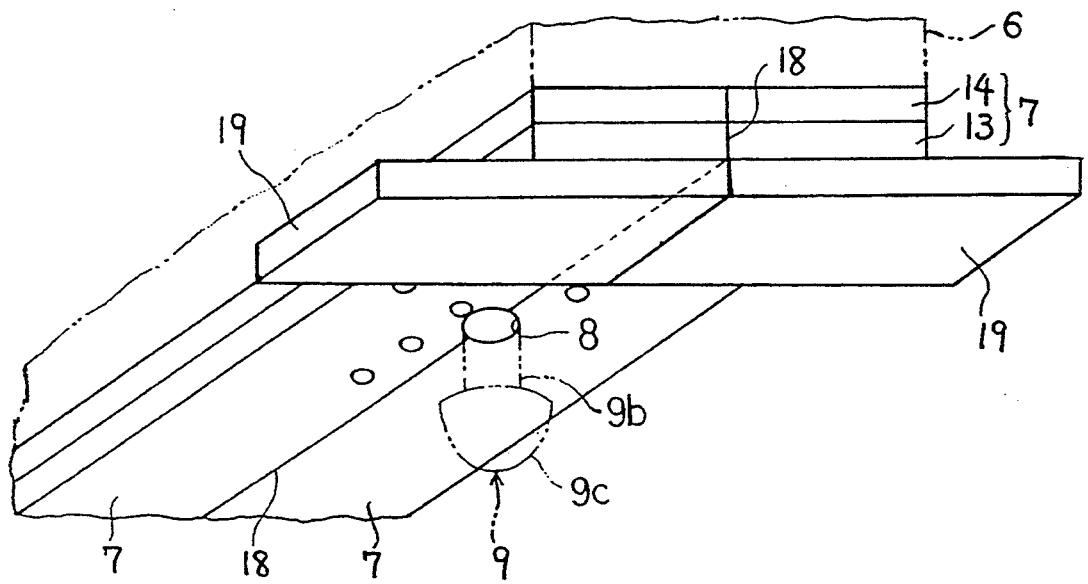
FIGS. 6 and 7 represent perspective views of a second embodiment of the release liner.
Figure 7:
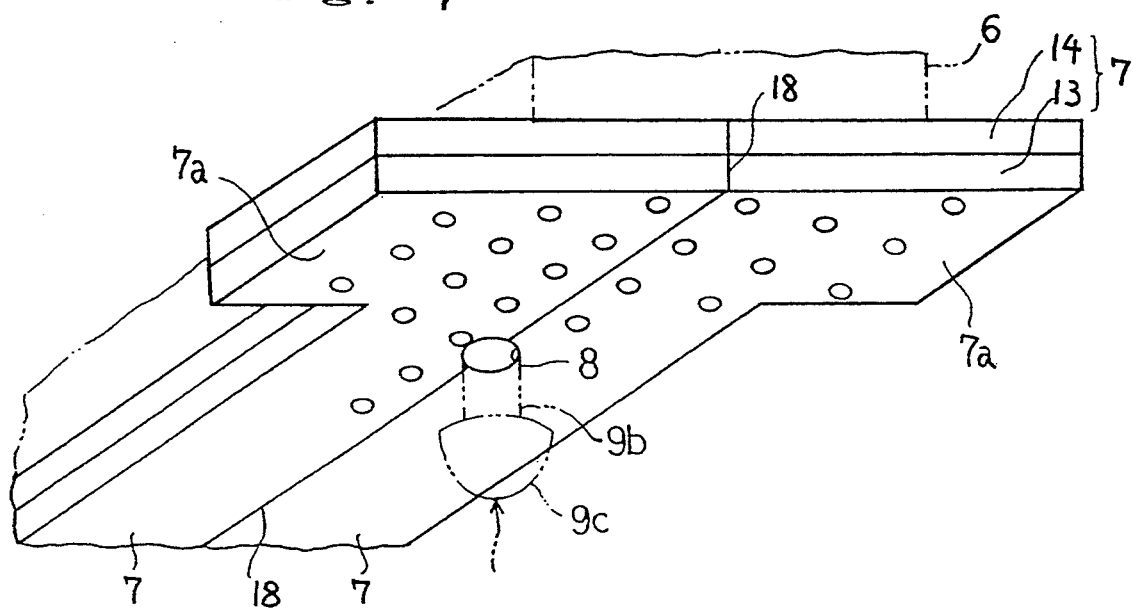

Tab tapes 19 (for example, made of polyethylene) may be applied to one end portion of each split liner piece of the release liner 7, as shown in FIG. 6, so that users can hold the tab tapes 19 for peeling off the pieces of release liner 7. Alternatively, each piece of the release liner 7 may have a tab 7a formed at one end portion, as shown in FIG. 7. Such tab tapes 19 and tabs 7a further facilitate the operation of removing the release liner 7 from the weatherstrip 1.

While clips 9 are employed in the above embodiment, for improved positioning, they might be eliminated from the weatherstrip 1. While the adhesive layer 6 includes a heat-fusible film 10, urethane sheet 11 and an adhesive 12, the adhesive layer 6 might alternatively be formed of an adhesive layer 12 only. Any conceivable modifications or variations are acceptable for the adhesive layer 6, so long as the fundamental function of the adhesive layer 6, i.e. the function of bonding the weatherstrip 1 to the vehicle body 15, is not impaired.

Therefore, the present examples and embodiments are to be considered as illustrative and not restrictive, and the invention is not to be limited to the details related herein. The present invention is meant to include all modifications and alternate embodiments included within the spirit and scope of the appended claims.

What is claimed is:

1. A weatherstrip for use with a vehicle body, comprising:
   a strip body having a base and a seal portion formed integrally with said base, said base having a fitting surface for contacting the vehicle body;
   an adhesive layer applied on said fitting surface, for bonding said strip body to the vehicle body; and
   a release liner for protecting said adhesive layer, said release liner including a synthetic resin non-woven fabric layer comprised of a composite fiber having a polyethylene terephthalate core and a polyethylene sheath and a film layer laminated to said non-woven fabric layer.

2. The weatherstrip according to claim 1, wherein said film layer is made of at least one synthetic resin selected from the group consisting of polyolefin and polyester.

3. The weatherstrip according to claim 1, wherein said non-woven fabric layer and said film layer are heat-fused to one another, and the material forming said film layer penetrates into said non-woven fabric layer for added strength.

4. The weatherstrip according to claim 1, wherein said release liner includes tab means for handling convenience.

5. The weatherstrip according to claim 1, wherein said adhesive layer includes in order a heat-fusible film, a urethane sheet and an adhesive applied to said urethane sheet.

6. The weatherstrip according to claim further comprising clips for mechanically connecting said strip body to the vehicle body.

7. A weatherstrip as in claim 1 wherein the release liner has a tensile strength of about 4 kgf.

* * * * *